Dec. 22, 1942.   R. E. MEANY   2,306,178
PROCESS OF LAMINATING MULTI-PLY WEBS
Filed Nov. 8, 1939
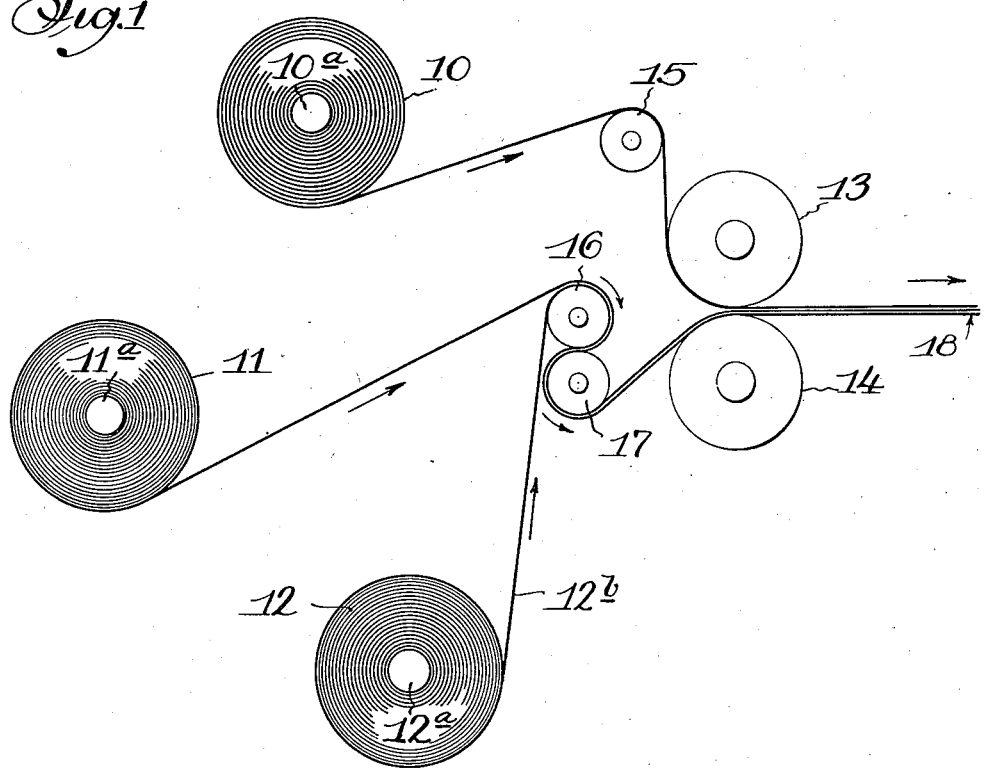
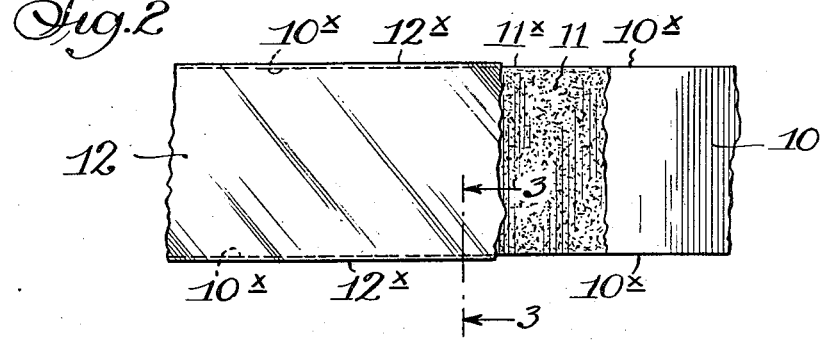
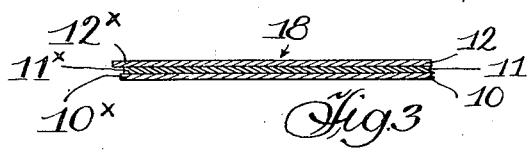
INVENTOR.
Robert E. Meany,
BY
ATTORNEYS.

Patented Dec. 22, 1942

2,306,178

UNITED STATES PATENT OFFICE 2,306,178

PROCESS OF LAMINATING MULTIPLY WEBS

Robert E. Meany, Chicago, Ill., assignor to Wm. Wrigley Jr. Company, Chicago, Ill., a corporation of Delaware Application November 8, 1939, Serial No. 303,349

1 Claim. (Cl. 154—2)

This invention relates to a novel and improved laminated web and a process for making the same, and consists of the matters hereinafter described and more particularly pointed out in the appended claim.

The improved laminated web is designed to be fed to a machine for wrapping packages of chewing gum or the like wherein it is severed at predetermined intervals into wrappers of equal length, each bearing printed or colored label matter symmetrically disposed and designed to appear in proper relation to the sides and ends of the wrapped package.

One object of the invention is to provide a multi-ply web comprising an outer ply of Cellophane upon which are defined by color and otherwise a plurality of wrappers of like length disposed end to end on said web, and each bearing label matter; an inner ply of metal foil; and an intermediate ply of wax paper adhered on one face to the Cellophane ply and on the other face to the foil ply.

In the making of such a multi-ply web the foil, the wax paper and the Cellophane plies are severally drawn from magazine rolls, from which they pass over idle rolls and thence between heated pressure rolls to laminate the multi-ply web, which is then cooled in a suitable manner.

It has been found that whatever means may be used to prevent it, the several plies are apt to weave from side to side of the path designed to be followed by each of them from its respective roll. As a result the associated lateral edges of the several plies fail to register, and a margin of the paper and/or foil ply will project slightly beyond the associated edge of the Cellophane web, sometimes at one side and sometimes at the other, and be exposed to view in the laminated web, with the result that the appearance of the wrapped package will be marred.

Another object of the invention is to provide an improved laminated web and process for making the same, in which the edges of the paper and/or of the foil will not be exposed in the laminated web beyond the edges of the Cellophane, with the unsightly appearance at the ends of the package resulting therefrom.

In the drawing:

Figure 1 is a diagrammatic view showing an apparatus for laminating a multi-ply web of the kind.

Figure 2 is a plan view showing fragmentary lengths of the several plies intended to form the improved laminated web, with said lengths superposed upon one another (with the Cellophane web uppermost) to show the relative widths of said plies.

Figure 3 is a partial cross section through the laminated multi-ply web, drawn on an exaggerated scale, to show one of the possible relations of the several edges of the plies in the finished product.

Referring now to the drawing: 10 indicates a magazine roll of foil mounted in any suitable or familiar manner to rotate upon its longitudinal central axis 10ª; 11 indicates a roll of wax paper mounted to rotate upon its central axis 11ª; and 12 indicates a roll of a ply of label-bearing Cellophane with wrappers successively defined thereon, mounted to rotate upon its central axis 12ª. As a ply of Cellophane printed and colored as described is old, the printing and coloring are not shown in the drawing. Said printing and coloring are disposed on the surface 12ᵇ of the Cellophane ply 12, which surface is the one presented to the outside when a package is wrapped. The so-called wax paper of the roll 11 is thermoplastic. Specifically, it is a thin paper impregnated on both surfaces with an adhesive which is non-tacky when cold, so that the paper may be rolled upon itself without adherence of adjacent windings of the roll. Said adhesive, however, becomes quite tacky when heated and acts to securely adhere the paper to the Cellophane on one side and to the metal foil on the other side. The result is a three-ply laminated web with the plies secured together in close relation so that they act together as one.

The use of the paper as an adhesive bearer intermediate the Cellophane and the foil stiffens the multi-ply web and the wrappers severed therefrom. This makes it possible to use a much lighter foil required for wrappers of a certain stiffness with a substantial reduction in the expense of the web and of the wrappers made therefrom.

13, 14 indicate pressure rolls between which the several webs are passed, first being passed about idle rolls 15, 16 and 17 as clearly indicated in the drawing. Beyond said heated pressure rolls 13, 14 the laminated web is subjected to cooling means and then passes as the finished web 18 to the wrapping machine (not shown) in a familiar manner.

The Cellophane wrapper-defining ply 12 is made wider than the foil ply 10 and the wax paper ply 11. This is shown in Figure 2 where the lateral edges 12ˣ, 12ˣ of the Cellophane ply 12 are spaced apart at a distance greater than the lateral edges 10ˣ, 10ˣ of the foil ply 10, and the lateral edges 11ˣ, 11ˣ of the wax paper ply 11.

Preferably, and as producing the best result, the Cellophane ply 12 is made about 1/16 of an inch wider than the foil ply 10 and the intermediate wax paper ply 11. This approximates the maximum of the relative lateral weave of the several plies. When the laminated finished web 18 is produced, neither the lateral edges of the foil nor the lateral edges of the wax paper will be exposed beyond the lateral edges 12ˣ, 12ˣ of the Cellophane ply 12, but will remain within the limits defined by said edges as shown in exaggerated detail in Figure 3.

As a result, when the wrappers are severed from the web 18 and applied to the packages, neither the foil nor wax paper plies will be exposed at the ends of the wrapped package to mar its appearance.

I claim as my invention:

The process of laminating a multi-ply web having the lateral edges of the plies in approximate registration, consisting in passing a plurality of plies superposed one upon the other between heated pressure rolls, at least one of the plies carrying a thermo-plastic coating, the outer ply being wider than the ply or plies upon which it is superposed, by an amount limited to compensate for the relative weave of the several plies comprising said wab, to prevent the appearance of the lateral edge of a narrow ply beyond the edge of the outer ply.

ROBERT E. MEANY.